Patented Sept. 8, 1931 1,822,819

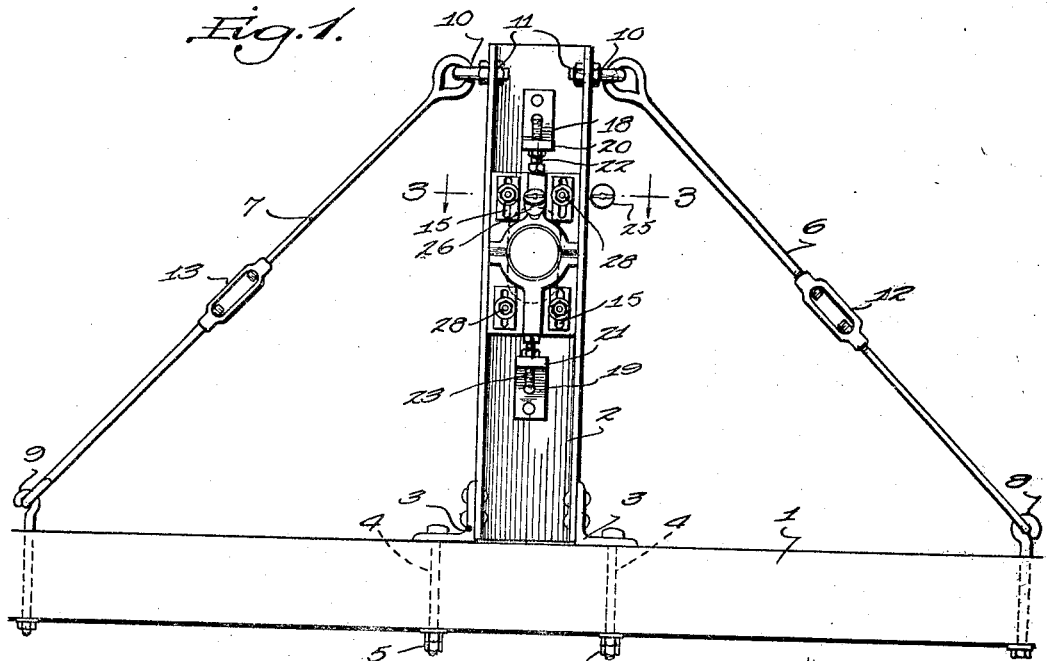

UNITED STATES PATENT OFFICE

HARRY F. MORAN, OF WOOSTER, OHIO, ASSIGNOR TO THE PARKERSBURG RIG AND REEL COMPANY, OF PARKERSBURG, WEST VIRGINIA, A CORPORATION OF WEST VIRGINIA

SAND REEL POST

Application filed June 28, 1927. Serial No. 202,120.

This invention relates to oil drilling apparatus and more particularly to an adjustable bearing and a post for supporting the bearing, which bearing supports a shaft used in operating a sludge pump.

As is well known, in oil drilling operations after the drill has been sunk to a certain depth it is necessary from time to time to remove the sand and dirt from the well by means of a sludge pump or similar apparatus. This pump is driven from pulleys on a sand reel shaft.

This invention deals more particularly with an adjustable bearing for supporting the shaft used to raise and lower the rope or other device employed in working the sludge pump.

In the drawings wherein I have shown the preferred embodiment of my invention,

Figure 1 is a front elevation of the bearing, post and supporting structure therefor, Figure 2 is a side elevation of the post and bearing shown in Figure 1, Figure 3 is a horizontal section on line 3—3 of Figure 1, and Figure 4 is a perspective view of the adjustable bearing and post, in detached positions.

In the drawings, the numeral 1 designates a supporting structure to which post 2 is rigidly attached by means of brackets 3 bolted to the post which is preferably formed of an I-beam and connected to support 1 by means of bolts 4 extending through the horizontal flanges of the brackets 3 and being held in place by nuts 5 on the lower side of support 1. The post 2 is further maintained in a rigid position by means of braces 6 and 7 attached at one end to bolts 8 and 9 extending through the support 1 at points spaced from the base of the post 2. At the opposite ends these braces 6 and 7 are connected to U-bolts 10 extending through the side flanges of the I-beam at points adjacent the top of the beam and held in place by nuts 11. The braces 6 and 7 include turnbuckles 12 and 13 by means of which these braces may be shortened or elongated in order to rigidly secure the post 2 in its desired position.

The bearings which support the shaft (not shown), which shaft has pulleys used to raise and lower the rope to which the sludge pump is attached, are adjustably mounted within the side flanges of the I-beam post 2 intermediate the ends of said post. The bearings consist of horizontal and vertical portions, the vertical portions being adapted to be secured to the I-beam post. These bearings can be adjusted to fit various sized shafts. The horizontal portions of the bearings are formed with semicircular pockets 14 adapted to receive the shaft. The pockets are lined with bearing metal designated 14'. As best shown in Figure 4 of the drawings, the vertical portions of each bearing member have slots 15 extending therethrough. An opening 16 adapted to receive the power shaft (not shown) and bolt holes 17, are formed in the web of post 2.

Rigidly mounted on the web of post 2, above and below the bearing members are brackets 18 and 19. The horizontal flanges 20 and 21 of these brackets have screw-threaded openings adapted to receive bolts 22 and 23. Each of the bearing members is provided with an oil hole 24 as best shown in Figures 2 and 4. The bearing members are supplied with oil or grease through these holes by means of oil or grease cups 25 and 26 attached adjacent the bearings and having ells 27 fitting into the oil holes 24.

In assembling the bearings they are inserted between the side flanges of the I-beam post 2 and bolts 28 are inserted through slots 15 of the bearings and through hole 17 in the posts 2. The nuts are then tightened in place. In order to additionally secure the bearings in their adjusted position bolts 22 and 23 are screwed into contact with the bearing members. If it be desired to replace a shaft with another shaft of different size, it is only necessary to loosen the bolts 28 and 22, adjust the bearings to their desired positions and again tighten the bolts.

It will be seen that by the above arrangement I have provided a simple, durable and efficient adjustable mounting for a shaft which can be quickly and easily adjusted in positions to receive various sized shafts or in which a bearing when worn can readily be replaced by a new bearing.

It will be understood that I have set forth the preferred embodiment of my invention and that various changes may be made in the size, number and arrangement of parts without departing from the spirit of my invention or the scope of the subjoined claims.

I claim:

1. A device of the character described comprising a support, an I-beam post rigidly connected to said support, U-bolts adjacent the top of said post, adjustable braces including turnbuckles connected at one end to said U-bolts and at their opposite end to said support at points spaced from the base of said post, and two cooperating bearings adjustably mounted on said post.

2. A device of the character described comprising a supporting structure, a post rigidly attached to said structure, bearings adjustably connected to each side of said post, said bearings comprising upper and lower sections, each of said sections comprising horizontal and vertical portions, brackets rigidly connected to said post above and below said bearings, and bolts adapted to engage said brackets and the horizontal portions of said sections to hold said bearings in adjusted position.

3. A device of the character described comprising a support, a post rigidly connected to said support, said post being provided with a relatively large opening and a plurality of small openings spaced from said large opening, bearings adjustably connected to said posts, said bearings comprising substantially vertical and horizontal portions, said vertical portions being provided with a plurality of elongated slots in alinement with the small openings in said posts, bolts secured in said slots and certain small openings to hold said bearings in adjusted position, brackets rigidly connected to said post above and below said bearings, and bolts adapted to engage said brackets and the horizontal portions of said bearings to hold said bearings in adjusted position.

In testimony whereof I affix my signature.

HARRY F. MORAN.